United States Patent Office 3,538,225
Patented Nov. 3, 1970

3,538,225
CONTROL OF ANIMAL DISEASE USING CERTAIN 2,3-DIHYDRO-5-CARBOXAMIDO - 6-METHYL-1,4-OXATHIINS
Mitchell D. Dudarevitch, Cheshire, and Bogislav von Schmeling, Hamden, Conn., and Marshall Kulka, Guelph, Ontario, Canada, assignors to Uniroyal, Inc., a corporation of New Jersey
No Drawing. Filed June 27, 1966, Ser. No. 560,902
The portion of the term of the patent subsequent to May 3, 1983, has been disclaimed and dedicated to the Public
Int. Cl. A01n 9/12; A61k 27/00
U.S. Cl. 424—276                8 Claims

ABSTRACT OF THE DISCLOSURE

Ringworm or similar fungus disease of the skin in animals is controlled by administration (e.g., topical, oral) of certain N-substituted 2,3-dihydro-5-carboxamido-6-methyl - 1,4 - oxathiins, such as 2,3-dihydro-5-n-hexyl-carboxamido-6-methyl-1,4-oxathiin.

---

This invention relates to the control of fungus-produced animal diseases, and more particularly it relates to the control of diseases caused by fungus organisms in animals, including human subjects, by treating the animal with a chemical of the formula:

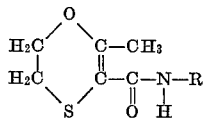

where R may have various values, as will be explained in more detail below.

The chemicals employed in the invention may be termed 2,3-dihydro-5-carboxamido-6-methyl-1,4-oxathiins. Such chemicals are disclosed, in U.S. Pat. 3,249,499, issued to Von Schmeling et al. on May 3, 1966, as fungicides and bactericides useful particularly for application to plant life. In accordance with the present invention, the chemicals may be used in the treatment of animal life, including human subjects, to aid in the prevention and/or alleviation of fungus diseases. The chemicals are especially useful against dermatophytes.

Particularly interesting chemicals for use in the invention are those in which R has the following values: 2-biphenylyl, n-hexyl, m-tolyl, 2,6-diethylphenyl, n-pentyl, 2,4,6-trimethylphenyl, 2,6-dimethylphenyl, 2,6-diisopropylphenyl, n-octyl, isopropyl, cyclohexyl, o-ethylphenyl, 2-chloro-6-methylphenyl, 3,4-dichlorophenyl, n-dodecyl, phenyl, n-butyl, m-bromophenyl, benzyl, 2,3-dimethylphenyl, n-decyl, o-tolyl, beta-naphthyl, m-trifluoromethylphenyl, 5-chloro-2-methylphenyl, and 3-chloro-4-methylphenyl. Less preferred values for R include allyl, 3,5-dichlorophenyl, 3-chloro-2-methylphenyl, 2,5-dimethylphenyl, and ethyl. Thus, in addition to various hydrocarbon values (e.g. alkyl up to 12 or more carbon atoms), R may be an equivalent substituted hydrocarbon, as exemplified.

The chemicals may be applied internally or externally to animal subjects infected with, or threatened with infection by, pathogenic fungi of various sorts. The chemicals are active against, for example, the human pathogen *Trichophyton mentagrophytes* var. *interdigitale* with interesting results, as demonstrated by an agar plate method both with and without added horse serum (to simulate body fluids which inactivate compounds). The invention is also applicable to other pathogens, for example *Monilia*, *Sporotrichum*, etc. Particular mention may be made of the effectiveness of the present chemicals against *Trichophyton rubrum* and *Microsporum audouini*.

For application, the chemicals are suitably mixed with a conventional pharmaceutical carrier. For example, an ointment may be prepared by combining the chemical with an appropriate base, such as petrolatum. For application as a powder, the chemical is conveniently mixed with a finely divided particulate substance, such as talc. For application as a solution, an appropriate solvent such as ethyl or isopropyl alcohol may be used to dissolve the chemical.

The chemicals have a systemic action which gives rise to interest as internal medication, in the form of capsule, pill, or suppository for oral, rectal or vaginal administration.

The dosage or concentration of the active chemical suitable in any given case will vary with such factors as the particular chemical involved, the specific pathogen present, the method of application, the body weight of the subject, the frequency of application or dosage, the toxicity of the chemical to the particular host, etc. An optimum value in any given set of circumstances can readily be determined by test.

A preferred form of the invention utilizes the easily available chemical in which R is phenyl.

The following examples will serve to illustrate the practice of the invention in more detail.

EXAMPLE 1

The 2,3-dihydro-5-carboxamido-6-methyl-1,4-oxathiins shown in Table I are subjected to tests against the human pathogen *Trichophyton mentagrophytes* var. *interdigitale* with the results shown.

The test procedure is a modified agar plate method. A sterile base layer of Sabouraud dextrose agar is poured into sterile Petri dishes or baking dishes and allowed to harden. A seed layer, containing 10–15% of a 14 day broth culture of *Trichophyton mentagrophytes* var. *interdigitale*, is overlayed on the hardened base layer and solidified. The chemicals are tested by making appropriate dilutions in acetone, or other solvent, and paper antibiotic assay discs (6 mm. radius) are dipped in the solution, drained and placed on the agar surface.

The plates are incubated for 3–5 days at 35–37° C. (or at 28–30° C. when excessive drying may occur at higher temperatures). Observations are made for inhibitory properties, zones of inhibition and/or general growth characteristics on the agar and test specimen. For purposes of comparison, Table I also shows the results obtained with certain controls, including the Griseofulvin and undecylenic acid 10%.

TABLE I.—FUNGISTATIC TEST (AT 1,000 p.p.m.; 35–37° C.; 96 HOURS)

| Value of R in chemical tested | Relative rating | Radius of zone of inhibition, in mm. |
|---|---|---|
| 2-biphenylyl | 1 | 35 |
| n-hexyl | 2 | 25 |
| m-tolyl | 3 | 20 |
| 2,6-diethylphenyl | 3 | 20 |
| n-pentyl | 5 | 15 |
| 2,4,6-trimethylphenyl | 5 | 15 |
| 2,6-dimethylphenyl | 5 | 15 |
| 2,6-diisopropylphenyl | 8 | 14 |
| n-octyl | 8 | 14 |
| isopropyl | 10 | 13 |
| cyclohexyl | 10 | 13 |
| o-ethylphenyl | 12 | 11 |
| 2-chloro-6-methylphenyl | 12 | 11 |
| 3,4-dichlorophenyl | 14 | 10 |
| n-dodecyl | 14 | 10 |
| phenyl | 16 | 9 |
| n-butyl | 16 | 9 |
| m-bromophenyl | 16 | 9 |
| benzyl | 19 | 8 |
| 2,3-dimethylphenyl | 19 | 8 |
| n-decyl | 19 | 8 |
| o-tolyl | 22 | 7 |
| beta-naphthyl | 22 | 7 |
| m-trifluoromethylphenyl | 22 | 7 |
| 5-chloro-2-methylphenyl | 22 | 7 |
| 3-chloro-6-methylphenyl | 22 | 7 |
| Control 1, Griseofulvin[1] | | 20 |
| Control 2, undecylenic acid 10% | | 0 |
| Control 3, acetone | | 0 |
| Control 4, assay disc | | 0 |

[1] 7-chloro-4,6-dimethoxycumaran-3-one-2-spiro-1'-(2'-methoxy-6'-cyclohex-2'-en-4'-one).

In addition, reduced growth near the assay disc was noted with compounds in which R was allyl, 3,5-dichlorophenyl, 3-chloro-2-methylphenyl, 2-5-dimethylphenyl and ethyl.

The 2-biphenylyl chemical and the n-hexyl chemical are particularly notable because they are more active than Griseofulvin, and much more active than undecylenic acid 10%.

EXAMPLE 2

A fungistatic test is carried out according to the agar plate method described in Example 1, except that this time there are also included tests in which the culture broth includes 10% sterile horse serum to simulate body fluids which have an inactivating effect. The radius of the assay disc in this example is 6 mm. The temperature of the test is 35–37° C.; the duration is 95 hours. Results are shown in Table II.

TABLE II.—FUNGISTATIC TEST (AT 100 p.p.m.)

| Value of R in chemical tested | Zone of inhibition in mms. | |
|---|---|---|
|  | Without horse serum | With horse serum |
| phenyl | 6.5 | 3.0 |
| m-tolyl | 19.0 | 3.5 |
| n-hexyl | >15.0 | 6.5 |
| 2,6-diethylphenyl | 15.0 | 4.0 |

The chemicals shown in Table II retained activity even in the presence of the inactivating serum.

EXAMPLE 3

The following formulations for topical application are prepared:

Ingredients: Parts by weight
(a) Ointment—
  Propylene glycol _____ 6.00
  Water _____ 1.92
  Penetrant (e.g., trimethyl nonyl polyethylene glycol ether) _____ 0.25
  Petrolatum, white _____ 90.83
  Active ingredient (oxathiin, as disclosed herein) _____ 1.00
                                         ——————
                                         100.00

(b) Powder—
  Boric acid _____ 10.00
  Starch _____ 9.90
  Active ingredient (oxathiin) _____ 1.00
  Purified talc q.s. _____ 100.00

(c) Solution—
  Isopropyl alcohol _____ 99.00
  Active ingredient (oxathiin) _____ 1.00

Ointments containing 1% (w./w.) of active chemical, formulated as above, are tested against *Trichophyton mentagrophytes* var. *interdigitale* according to the seed agar technique described in Example 1. Portions of the ointment measuring 15 mm. x 15 mm. x 10 mm. are placed on the agar surface. Observations are made after a 96 hour incubation period at a temperature of 35–37° C., with the results shown in Table III.

TABLE III.—OINTMENT TEST

| R in active ingredient | Percent | Radius of zone of inhibition in mms. |
|---|---|---|
| n-hexyl | 1.0 | 30.0 |
| n-pentyl | 1.0 | 25.0 |
| 2,6-diethylphenyl | 1.0 | 25.0 |
| m-tolyl | 1.0 | 25.0 |
| 2-biphenylyl | 1.0 | 15.0 |
| Control 1, Griseofulvin | 1.0 | 15.0 |
| Control 2, undecylenic acid ointment [undecylenic acid (5%) zinc undecylenate (20%)] | 25.0 | 30.0 |
| Control 3, untreated | 0.0 | 0.0 |

EXAMPLE 4

Tests are conducted on additional strains of pathogenic dermatophytes, *Trichophyton rubrum* and *Microsporum audouini*, in accordance with the procedure of Example 1 (assay disc, 6 mm. radius; 35–37° C. for 96 hours) with the results shown in Table IV, at 1,000 p.p.m.

TABLE IV

| R | Radial zone of inhibition in mm. | |
|---|---|---|
|  | Trichophyton rubrum | Microsporum audouini |
| n-hexyl | 34 | 33 |
| 2-biphenylyl | 30 | 29 |
| m-tolyl | 28 | 22 |
| 2,6-diethylphenyl | 28 | 23 |
| n-pentyl | 20 | 18 |
| n-octyl | 23 | 26 |
| 2,4,6-trimethylphenyl | 16 | 18 |
| 2,6-dimethylphenyl | 15 | 15 |
| 2,6-diisopropylphenyl | 11 | 10 |
| Griseofulvin | 22 | 32 |
| Undecylenic acid solution 10% | >0.5 | 1 |
| Control untreated | 0.0 | 0.0 |

Having thus described our invention, what we claim and desire to protect by Letters Patent is:

1. The method of controlling animal skin disease caused by fungi which comprises treating the animal with a chemical of the formula:

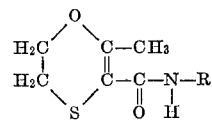

wherein R is selected from the group consisting of 2-biphenylyl, m-tolyl, 2,6-diethylphenyl, 2,4,6-trimethylphenyl, 2,6-dimethylphenyl, 2,6-diisopropylphenyl, cyclohexyl, o-ethylphenyl, 2-chloro-6-methylphenyl, 3,4-dichlorophenyl, phenyl, m-bromophenyl, benzyl, 2,3-dimethylphenyl, o-tolyl, beta-naphthyl, m-trifluoromethylphenyl, 5-chloro-2-methylphenyl, 3-chloro-4-methylphenyl, allyl, 3,5-dichlorophenyl, 3-chloro-2-methylphenyl, 2,5-dimethylphenyl, and alkyl having up to 12 carbon atoms, the fungus being controlled being a dermatophyte and the said chemical being administered topically in admixture with a pharmaceutical carrier, in amount effective to control said skin disease.

2. A method as in claim 1 in which R is biphenylyl.
3. A method as in claim 1 in which R is n-hexyl.
4. A method as in claim 1 in which R is m-tolyl.
5. A method as in claim 1 in which R is 2,6-diethylphenyl.
6. A method as in claim 1 in which R is n-pentyl.
7. A method as in claim 1 in which R is n-octyl.
8. A method as in claim 1 in which R is phenyl.

References Cited
UNITED STATES PATENTS

| | | | |
|---|---|---|---|
| 2,739,097 | 3/1956 | Ward | 167—53.2 |
| 3,249,499 | 5/1966 | Von Schmeling et al. | 167—33 |

ALBERT T. MEYERS, Primary Examiner

V. D. TURNER, Assistant Examiner